United States Patent
Challita et al.

(10) Patent No.: US 10,925,124 B2
(45) Date of Patent: Feb. 16, 2021

(54) STAND-UP INDUCTION HEATING TOOL FOR MEMBRANE ROOFING

(71) Applicant: OMG, Inc., Agawam, MA (US)

(72) Inventors: Antonios Challita, Bellbrook, OH (US); John P. Barber, Dayton, OH (US); Joshua S. Kelly, Longmeadow, MA (US)

(73) Assignee: OMG, Inc., Agawam, MA (US)

( * ) Notice: Subject to any disclaimer, the term of this patent is extended or adjusted under 35 U.S.C. 154(b) by 758 days.

(21) Appl. No.: 14/552,952

(22) Filed: Nov. 25, 2014

(65) Prior Publication Data

US 2015/0144617 A1 May 28, 2015

Related U.S. Application Data

(60) Provisional application No. 61/908,428, filed on Nov. 25, 2013.

(51) Int. Cl.
*H05B 6/42* (2006.01)
*H05B 6/10* (2006.01)
(Continued)

(52) U.S. Cl.
CPC ............. *H05B 6/42* (2013.01); *B29C 65/368* (2013.01); *B29C 65/3656* (2013.01);
(Continued)

(58) Field of Classification Search
CPC ...... H05B 6/42; H05B 6/105; B29C 65/3656; B29C 65/3668; B29C 65/368; B29C 65/46; B29C 65/4815; B29C 66/1122; B29C 66/474; B29C 66/72321; B29C 66/7392; B29C 66/742; B29C 66/861; B29C 66/21; B29C 66/43; B29C 66/08; E04D 15/04

USPC ....... 219/633, 603, 609, 612, 614, 624, 630, 219/634, 635, 645, 675, 677, 227, 236, 219/246, 242, 201, 254, 259, 386, 409, 219/418, 436, 453.11, 453.12, 454.12,
(Continued)

(56) References Cited

U.S. PATENT DOCUMENTS 3,109,084 A * 10/1963 Walsh ...................... B01L 7/00
211/74
4,123,305 A * 10/1978 Krzeszowski ..... A47G 27/0443
156/71
(Continued)

OTHER PUBLICATIONS

"The SFS intec field fastening system isoweld," product brochure, SFS intec, Inc., Fastening Systems, Wyomissing, PA, 2013.

*Primary Examiner* — Tu B Hoang
*Assistant Examiner* — Masahiko Muranami
(74) *Attorney, Agent, or Firm* — Alix, Yale & Ristas, LLP

(57) ABSTRACT

An induction heating tool has an induction heating coil configured to generate a magnetic field closely matched to the shape of the anchor plate. The induction heating tool includes a base configured to assist an operator in aligning the coil over each anchor plate. In the disclosed embodiments, the base supports a circular induction coil with a structure that clearly shows the position of the induction coil. In the disclosed embodiments, material surrounding the induction coil is removed or made transparent so the operator can see the roof immediately surrounding the induction coil as an additional aid in positioning the tool over anchor plates.

14 Claims, 14 Drawing Sheets

(51) Int. Cl.
*E04D 15/04* (2006.01)
*B29C 65/00* (2006.01)
*B29C 65/36* (2006.01)
*B29C 65/46* (2006.01)
*B29C 65/48* (2006.01)
*B29L 31/10* (2006.01)

(52) U.S. Cl.
CPC .......... *B29C 65/3668* (2013.01); *B29C 65/46* (2013.01); *B29C 65/4815* (2013.01); *B29C 66/1122* (2013.01); *B29C 66/474* (2013.01); *B29C 66/72321* (2013.01); *B29C 66/7392* (2013.01); *B29C 66/742* (2013.01); *B29C 66/861* (2013.01); *E04D 15/04* (2013.01); *H05B 6/105* (2013.01); *B29C 66/21* (2013.01); *B29C 66/43* (2013.01); *B29C 66/8122* (2013.01); *B29C 66/81267* (2013.01); *B29L 2031/108* (2013.01)

(58) Field of Classification Search
USPC ......... 219/456.1, 460.1, 461.1, 465.1, 467.1, 219/516, 520, 533, 538, 544, 546, 548, 219/552; 156/304.6, 309.9, 320, 321, 156/345.37, 345.52, 359, 379.9, 499, 156/583.1, 583.4, 583.7, 583.9
See application file for complete search history.

(56) References Cited

U.S. PATENT DOCUMENTS

| | | | | |
|---|---|---|---|---|
| 4,308,636 | A * | 1/1982 | Davis | A47L 11/34 15/321 |
| 4,533,423 | A * | 8/1985 | Johnson | B29C 66/73921 156/359 |
| 5,319,179 | A * | 6/1994 | Joecks | B23K 13/015 219/137 R |
| 5,374,809 | A * | 12/1994 | Fox | B23D 65/00 148/573 |
| 5,624,511 | A * | 4/1997 | Lippman | B29C 65/7835 156/157 |
| 6,229,127 | B1 * | 5/2001 | Link | H05B 6/06 219/518 |
| 8,492,683 | B2 | 7/2013 | Challita et al. | |
| 8,933,379 | B2 | 1/2015 | Challita et al. | |
| 2003/0121909 | A1 * | 7/2003 | Riess | B23K 13/01 219/633 |
| 2007/0023422 | A1 * | 2/2007 | Obata | H05B 6/105 219/633 |
| 2008/0029507 | A1 * | 2/2008 | Barber | H05B 6/105 219/633 |
| 2013/0119049 | A1 * | 5/2013 | Graber | H05B 6/062 219/621 |

* cited by examiner

STAND-UP INDUCTION HEATING TOOL FOR MEMBRANE ROOFING

BACKGROUND

The present disclosure relates generally to induction heating equipment. In particular, the present disclosure relates to a portable induction heating tool of a stand-up type which is used to seal anchor plates with heat-activated adhesive to an overlying roofing membrane.

Portable induction heating tools which are employed to seal roofing anchor plates having a heat-activated adhesive to an overlying roofing membrane are well known. It is particularly advantageous that the induction heating tool be of a type which can be placed over an anchor plate to be sealed and activated for heating the underlying metal anchor plate to activate the adhesive while the operator remains in a standing position during tool operation. Because the anchor plates are typically disposed below a membrane and are hidden, it can be challenging to clearly identify the position of the anchor plate and to properly position the tool over the anchor plate. The anchor plate may produce a slightly raised area or protuberance beneath the membrane, which may serve as a guide for positioning of the tool.

Some roofing installations include a thin sheet of metal foil on one face of the rigid foam insulation typically arranged beneath the membrane. To reliably heat the anchor plates, it is necessary to accurately couple the powerful magnetic field generated by the induction heating tool to the anchor plate while minimizing the magnetic energy dispersed into the surrounding foil. Therefore, it is important that the induction heating tool generate a magnetic field closely matched to the shape of the anchor plate and to align the induction coil over the anchor plate during each induction heating cycle. Accordingly, it is highly desirable to provide an induction heating tool that can be operated to accurately and consistently heat the metal anchor plate without losing energy to the surrounding foil.

SUMMARY

An induction heating tool has an induction heating coil configured to generate a magnetic field closely matched to the shape of the anchor plate. The induction heating tool includes a base configured to assist an operator in aligning the coil over each anchor plate. In the disclosed embodiments, the base supports a circular induction coil with a structure that clearly shows the position of the induction coil. In the disclosed embodiments, material surrounding the induction coil is removed or made transparent so the operator can see the roof immediately surrounding the induction coil as an additional aid in positioning the tool over anchor plates.

DETAILED DESCRIPTION

Figure 1:
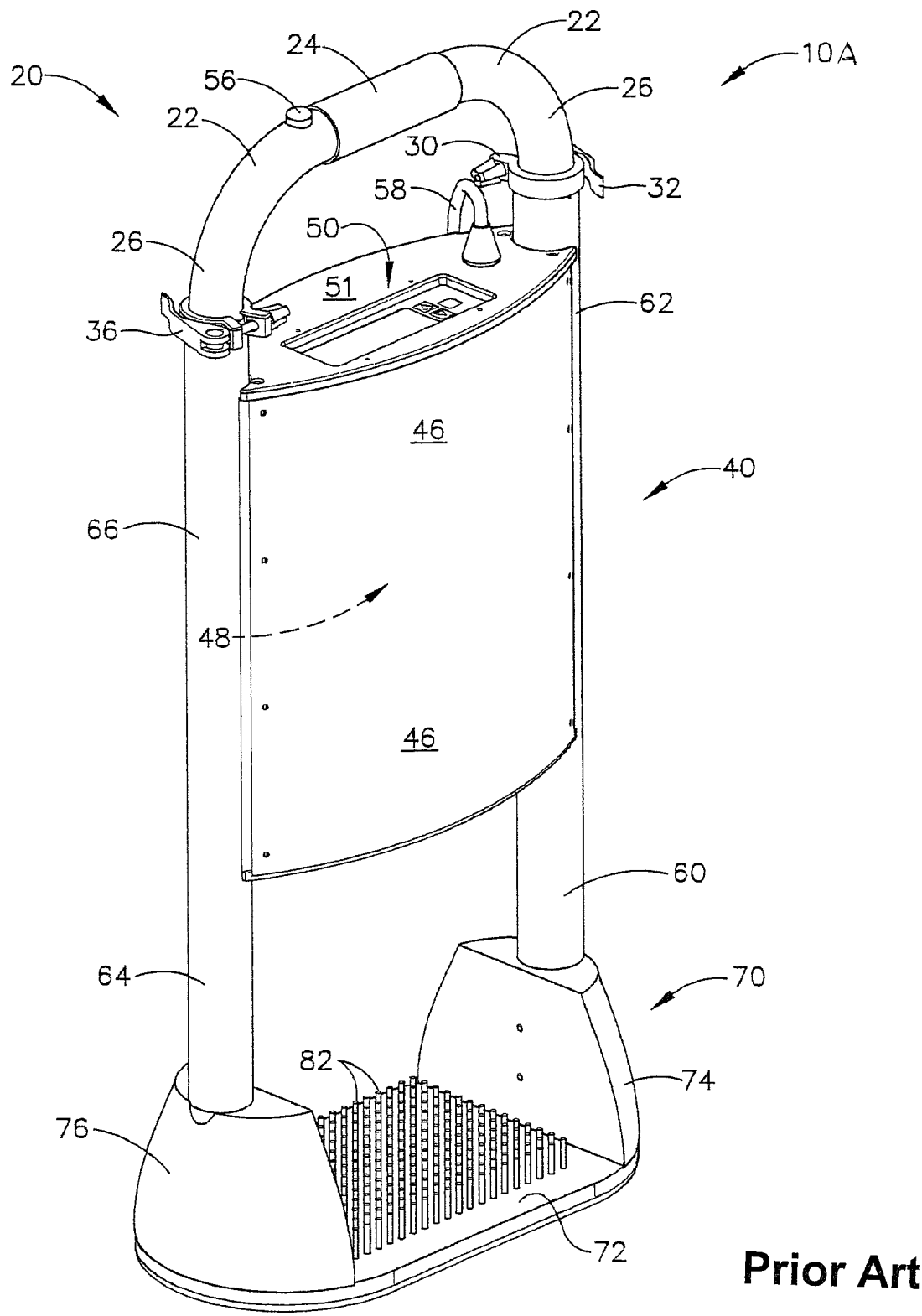
FIG. 1 is a perspective view of a prior art portable heat induction tool to which the present disclosure relates.
Figure 2:
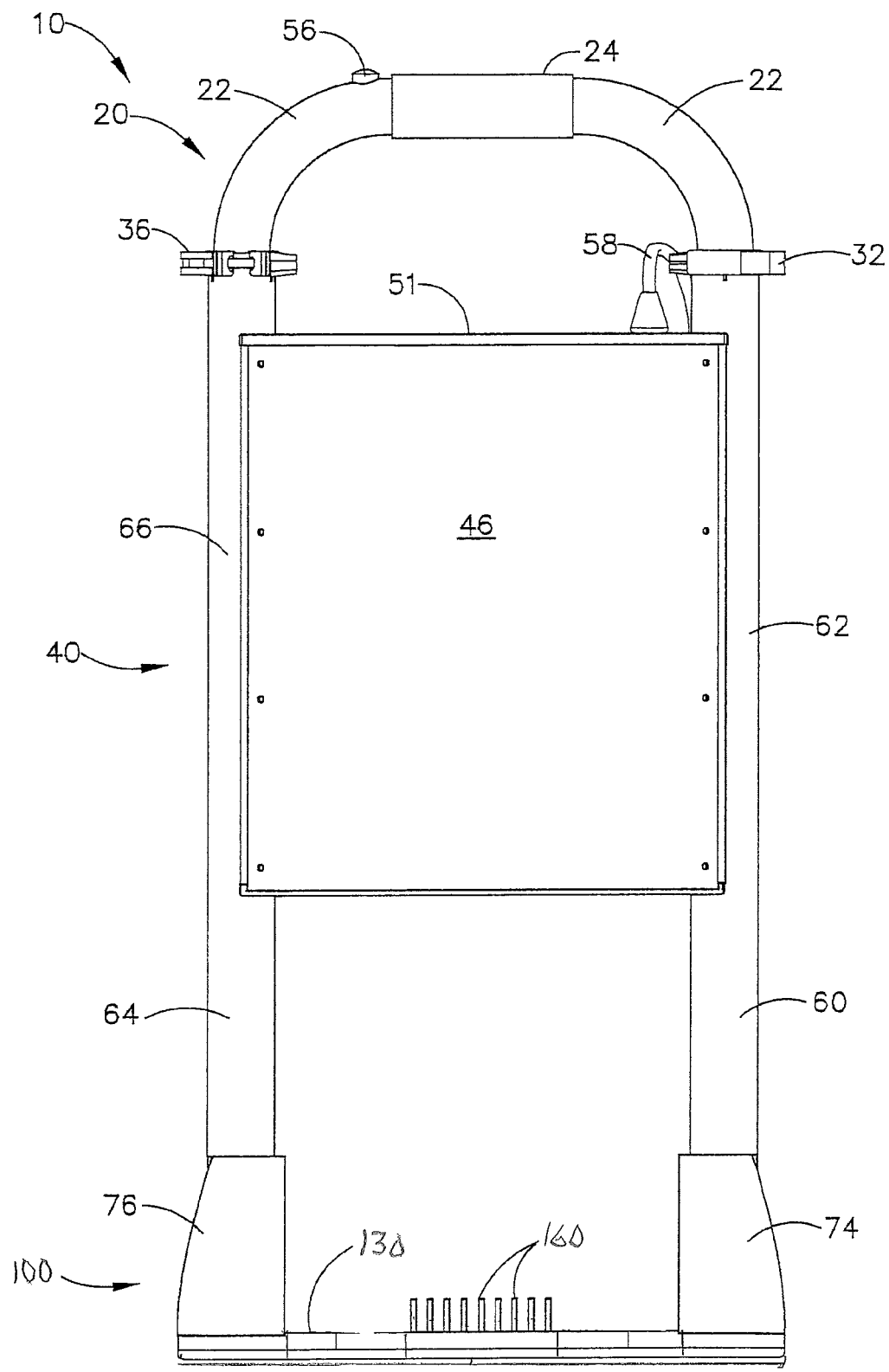
FIG. 2 is a front elevational view of a portable induction heating tool adapted for a foil roofing installation according to aspects of the disclosure.
Figure 3:
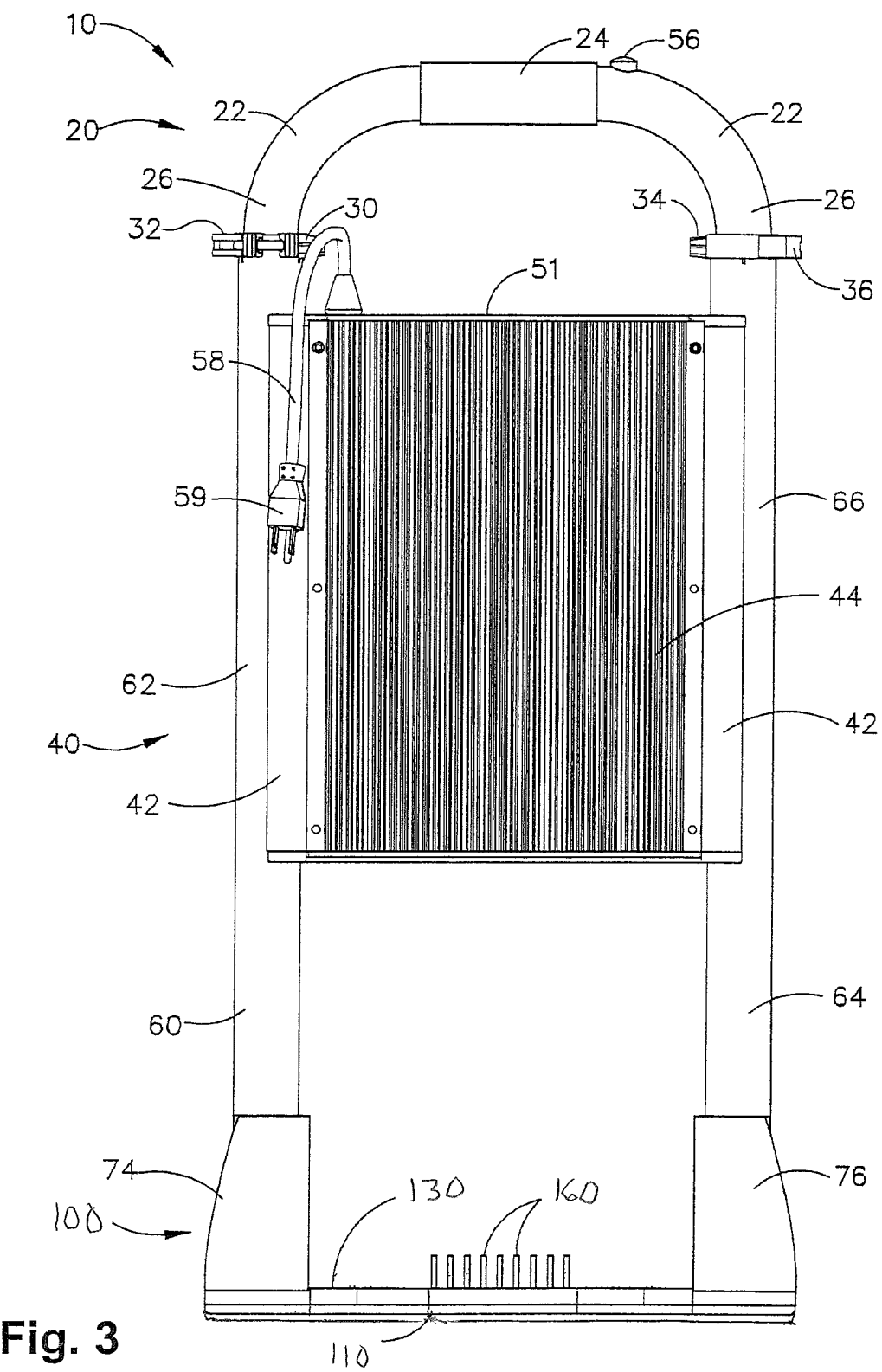
FIG. 3 is a rear elevational view of the tool of FIG. 2.
Figure 4:
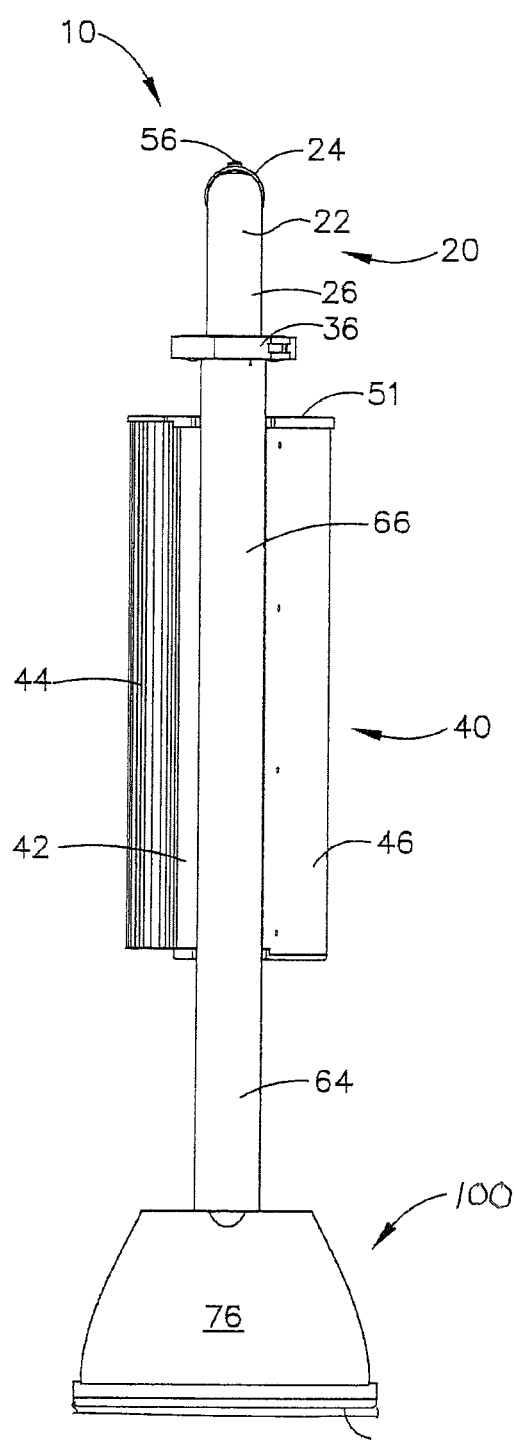
FIG. 4 is an elevational view from the right side of the tool of FIG. 2.
Figure 5:
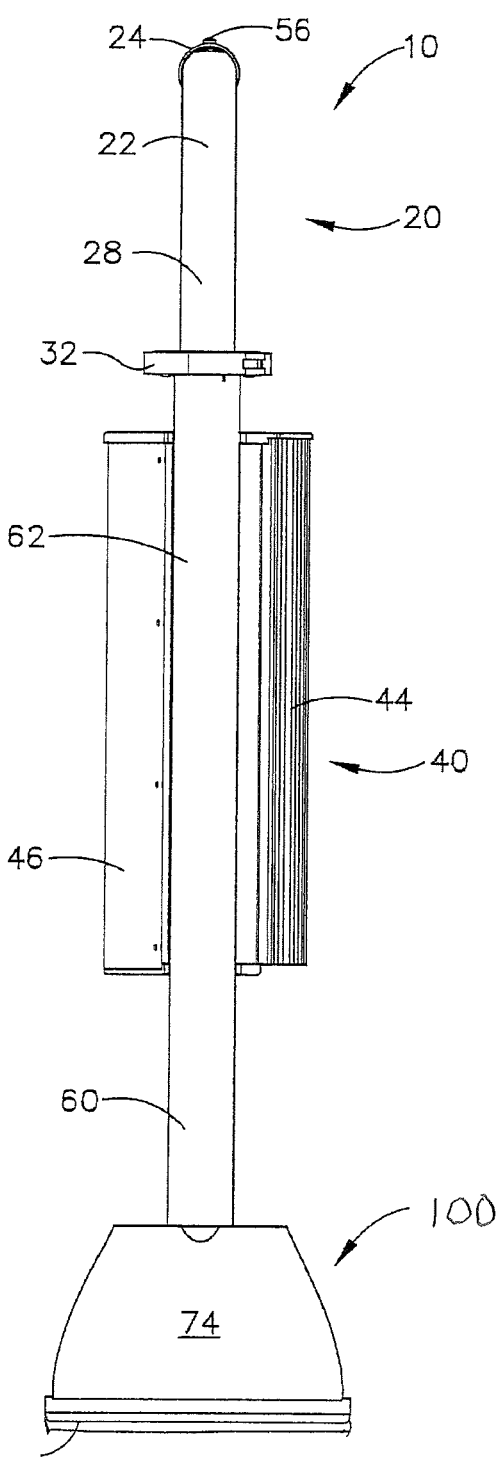
FIG. 5 is an elevational view from the left side of the tool of FIG. 2.
Figure 13:
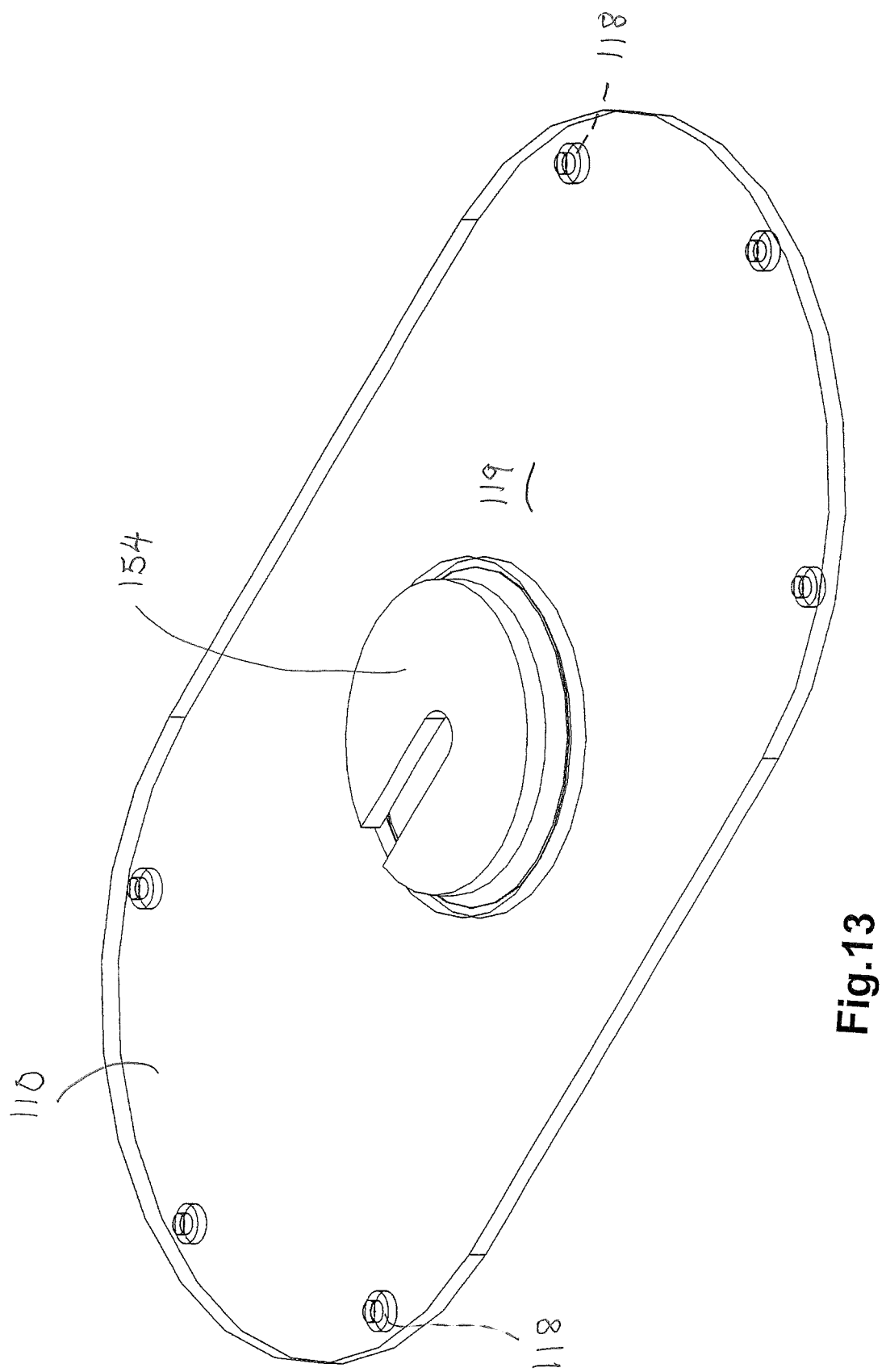
FIG. 13 is an enlarged top perspective view of a lower member of the base of FIG. 6, shown in functional conjunction with a dielectric spacer.

With reference to the accompanying drawings of FIGS. 2-12 wherein like numerals indicate the same elements throughout the views, a portable induction heating tool is generally designated by the numeral 10. The portable induction heating tool 10 incorporates a base 100 which is adapted for roofing applications including foil faced insulation as exemplified in FIG. 13. In addition, a related prior art portable induction heating tool is illustrated in FIG. 1 and designated by the numeral 10A.

The portable induction heating tool 10 is employed to heat anchor plates used in holding membrane roofs in position. The metal anchor plate functions as a susceptor and is inductively heated to activate the adhesive to bond the overlying membrane to the top of the metal plate. Induction heating tool 10 in an upright disposition has three major portions: a handle 20 (at an upper portion), a main body portion 40, and a base 100. The principal difference between induction heating tool 10 and the prior art as exemplified by representative induction heating tool 10A resides in the base 100. In heating tool 10A, the base is designate by the numeral 70.

The handle 20 includes an upper curved portion 22 that has a top grip 24. The handle 20 can be adjusted in length for ease of use by persons of different height. The two lowermost portions 26 of the handle 20 are depicted as being essentially vertical, where the lowermost portions 26 fit into a pair of vertical supports 62 and 66. The handle 20 can be extended, and one of those extensions is seen on FIG. 5, at the reference numeral 28.

Since the handle 20 has an adjustable length, the tool 10 has a pair of clamps 30 and 34 which are used to hold the handle 20 in position with respect to the vertical supports 62 and 66. The clamps 30 and 34 have pivotable cam arms 32 and 36 that can be released to adjust the height of the handle 20 with respect to the vertical supports 62 and 66. Once the user has moved the handle 20 to its proper height, the cam arms 32 and 36 can be tightened (i.e., pressed back against the clamps 30 and 34), thereby holding the vertical portions 26 (or 28) of the handle 20 in position with respect to the two vertical supports 62 and 66.

The central main body (or mid-portion) 40 of the tool 10 includes an outer housing 42 on one side that has a rather large array of heat sinks 44 at its mid-area that side of the mid-portion 40. On the opposite side of mid-portion 40 (see FIG. 2) the housing (or enclosure) depicted at reference numeral 46 is a cover (with no individual heat sinks thereon). The system controller and power supply are inside the mid-portion 40, and these electrical components are generally designated by the reference numeral 48, which are not visible in the figures. The reason for this is that the internal housing for the mid-portion 40 is completely sealed, and the electrical and electronic components cannot be seen from the outside of an assembled housing of tool 10.

The electrical components 48 are cooled by the heat sink array 44, by making mechanical contact with those heat sinks, thereby allowing heat transfer to occur by conduction (In other words, portions of the printed circuit board that holds the actual electrical components—including a casing that can surround a portion of the circuit board, if desired—can make physical contact with the base of the heat sink array 44, or can make contact with other heat conductive materials that will also make contact with the circuit board.). The entire heat sink array is designated by reference numeral 44, which comprises multiple individual "fin" heat sinks, including shorter fin heat sinks and longer fin heat sinks. The longer heat sinks 45 are not all of the same length, although any useful pattern of such heat sinks could be effectively utilized, without departing from the principles disclosed herein. The heat sinks are corrugated, to provide a larger surface area for convective cooling with the ambient air.

Using the type of construction described above and in the drawings, the portable induction heating tool 10 is designed to allow cooling air to reach the heat sink array 44, and those heat sinks are essentially directly coupled to the electrical components, using other heat-conductive structures. The "sealed" construction of the main body enclosure is essentially designed to deal with the harsh environment found in the typical roofing work environment, such as dust, debris, tar, and other "messy" materials.

The central portion 40 has a control panel 50 along its top surface 51, and an alphanumeric display screen 52 is located where a user may easily see messages that are displayed on the screen 52. There are user control pushbuttons 53 positioned adjacent to the display screen 52. In general, the pushbuttons 53 are used to scroll through various menus that are displayed on the screen 52, and to select or "enter" a particular control function once it has been displayed on the screen 52. The control buttons 53 may be flat-panel membrane switches or another type of low profile switch contacts; they are also sometimes referred to herein as a "plurality of user-actuated controls." Alternatively, screen 52 may be a touch screen and control buttons 53 may be configured as virtual buttons on the screen 52.

A heating cycle activation pushbutton 56 is also part of the user controls of the heating tool 10. This pushbutton 56 could be located in many different places, including on the upper control panel surface 50, if desired. However, in the illustrated embodiment, this activation pushbutton 56 is located on the handle portion 20, at a place that will be easily accessible to an operator of the induction heating tool 10. Pushbutton 56 is also sometimes referred to herein as a "manually-operable actuation device."

The induction heating tool 10 is electrically powered in the illustrated embodiment, and a power cord 58 is provided that enters the housing at the control panel surface 50. A plug 59 is provided at the end of the power cord 58. In the illustrated embodiment, the plug 59 is designed to interface into an electrical outlet or to an extension cord. For heating tools used in the United States and most North American geographic locations, the tool 10 will be powered by 120 volt AC line voltage. For European applications, the typical European A.C. voltage could be used instead, and the induction heating tool 10 will be provided with an appropriate power supply for the standard European voltage and frequency.

The middle portion of the induction heating tool 10 includes two vertical supports 62 and 66, as noted above. These supports extend further down at portions 60 and 64, respectively, which mechanically connect the upper and middle portions of the tool 10 to the base 100.

Figure 14:
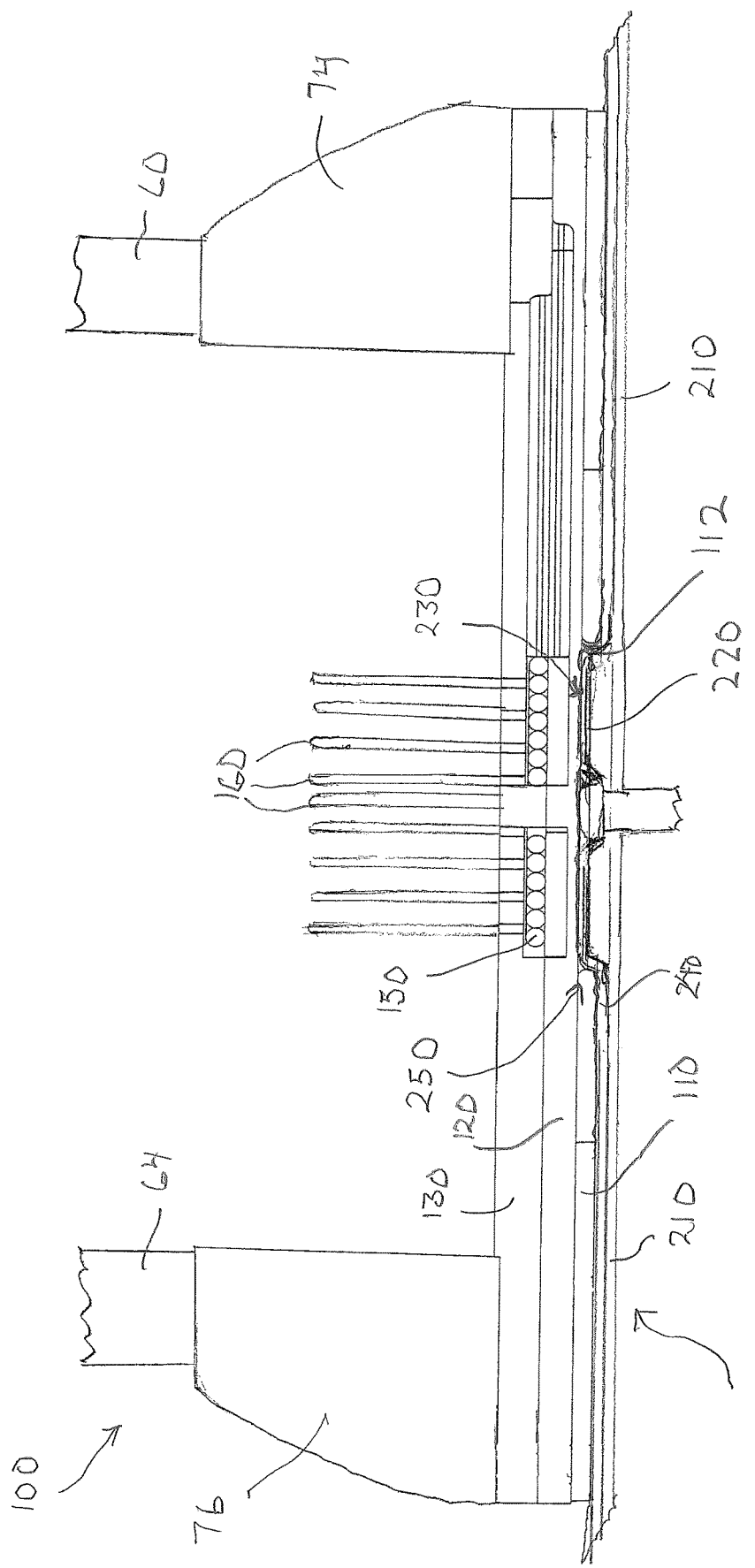
FIG. 14 is a side sectional view of a portion of a representative foil roof installation illustrating a protruding anchor plate and the base of a properly positioned induction heating tool.

With reference to FIG. 14, a representative roof installation 200, for which the base 100 is particularly adapted, is represented in somewhat exaggerated form. The roof contains an insulation material that may be covered by a thin aluminum foil 210. The anchor plate 220 is mounted above the foil using a fastener 221 extending through the insulation to engage a structural member of the roof (not shown). The anchor plate 220 has a heat-activated adhesive 230 disposed on an upward facing surface. A water-impervious membrane 240 is laid over the anchor plate 220 so that the anchor plate and its covering membrane 240 portion protrude slightly above the remaining flat surface of the roof to form a shallow mesa 250. The membrane 240 is typically 45-80 mils (each mil=$\frac{1}{1000}$ of an inch) in thickness. It will be appreciated that there are a multitude of anchor plates 220 preferably arranged in a grid across the roofing installation.

The base 100 is particularly adapted for installations which include a thin metal foil 210, but may also be used for installations that do not have a metal foil. The base 100 carries, protects and facilitates the positioning of the induction coil 150. First, the induction coil 150 is configured so that upon activation of an induction heating cycle, the magnetic field induction generally the same size and shape as the target anchor plate 220. The objective is to heat the metal anchor plate 220 sufficiently to activate the adhesive 230, while minimizing exposure of the surrounding foil to the magnetic field. A circular induction heating coil 150 is selected to have a diameter closely matched to the diameter of the anchor plate 220. When the coil 150 is centered over the anchor plate 220 during each induction heating cycle, exposure and heating of the surrounding foil is minimized.

The base includes a recess complementary to the protruding anchor plate 220/membrane 240 so that the proper positioning of the portable induction heating tool relative to the anchor plate may be positively tactilely detected upon positioning of the recess over the mesa 250. Third, the base further includes a transparent and/or translucent member 110 which provides a window 111 so that the underlying roof can be observed from above the tool and the position of the tool relative to the protruding anchor plate can be more easily achieved. Fourth, the foregoing induction heating process is accomplished in an efficient manner without requiring fans and complex moving parts to cool the heat induction tool by efficiently dissipating the heat via various fixed heat sink structures. Fifth, the induction tool can otherwise be configured to incorporate various desired features of the prior art.

With reference to FIGS. 6-12, the base 100 preferably has a generally oval shaped footprint and is configured to support the tool in a stable upright orientation on the roof. The base 100 is principally composed of three members, namely, a lower member 110, a medial member 120 and an upper member 130. The members are sandwiched together to provide a rugged base structure which is mounted to two vertical stand-off members 74 and 76 which mechanically connect to the bottommost portions of the vertical supports 60 and 64, respectively.

The lowermost member 110 (FIG. 9) includes a central recess 112. The recess 112 is dimensioned to receive the protruding anchor plate/membrane cover. The recess 112 is a rounded or chamfered inner rim 114 to provide a smooth glide-like reception of the protruding plate. The bottom surface 116 of the lower member is generally planar and includes counter-bored openings 118 for receiving the heads of fasteners for connecting with the stand-off members 74 and 76. The lower member 110 is preferably manufactured from a rugged acrylic or other rugged material which is essentially translucent or transparent. Clear plastic, Plexiglas and polycarbonate materials may also be had for member 110. The upper surface 119 is planar and engages in surface-to-surface relationship with the medial member 120.

The medial member 120 (FIG. 12) has a generally bowtie shape and includes a central shallow cylindrical recess 122. The recess 122 is generally dimensioned to be commensurate with the underside recess 112 of the lower member 110. The medial member also defines a longitudinal channel 124 for receiving an electrical cable for the coil 150. A central locating stud 126 projects centrally upwardly in the recess. The medial support member also includes bores 128 which align with the openings 118 of the lower member. The upper support member 130 (FIGS. 7 and 11) preferably has a bowtie-shaped profile generally identical to that of member 120. The underside surface 136 is planar and engages against the upper surface 129 of the medial support member in generally surface-to-surface relationship. The central portion of the member has a shallow cylindrical recess 132 which is generally dimensioned to be commensurate to that of recess 122 and aligns therewith to form a cavity 140 (FIG. 8) upon mating of the members. A central locating stud 136 also projects centrally in the recess. A longitudinal slot or channel 134 extends radially and cooperates with channel 124. Channel 134 communicates with an opening 142 extending vertically through the member. Bores 138 also align with the bores 128 and 118 of the other members to each receive a fastener for securing together the base member and connecting same to the stand-off members 74 and 76. The upper surface of member 130 has planar shelves 131 for receiving the bottom ends of the stand-off members 74 and 76.

Figure 10:
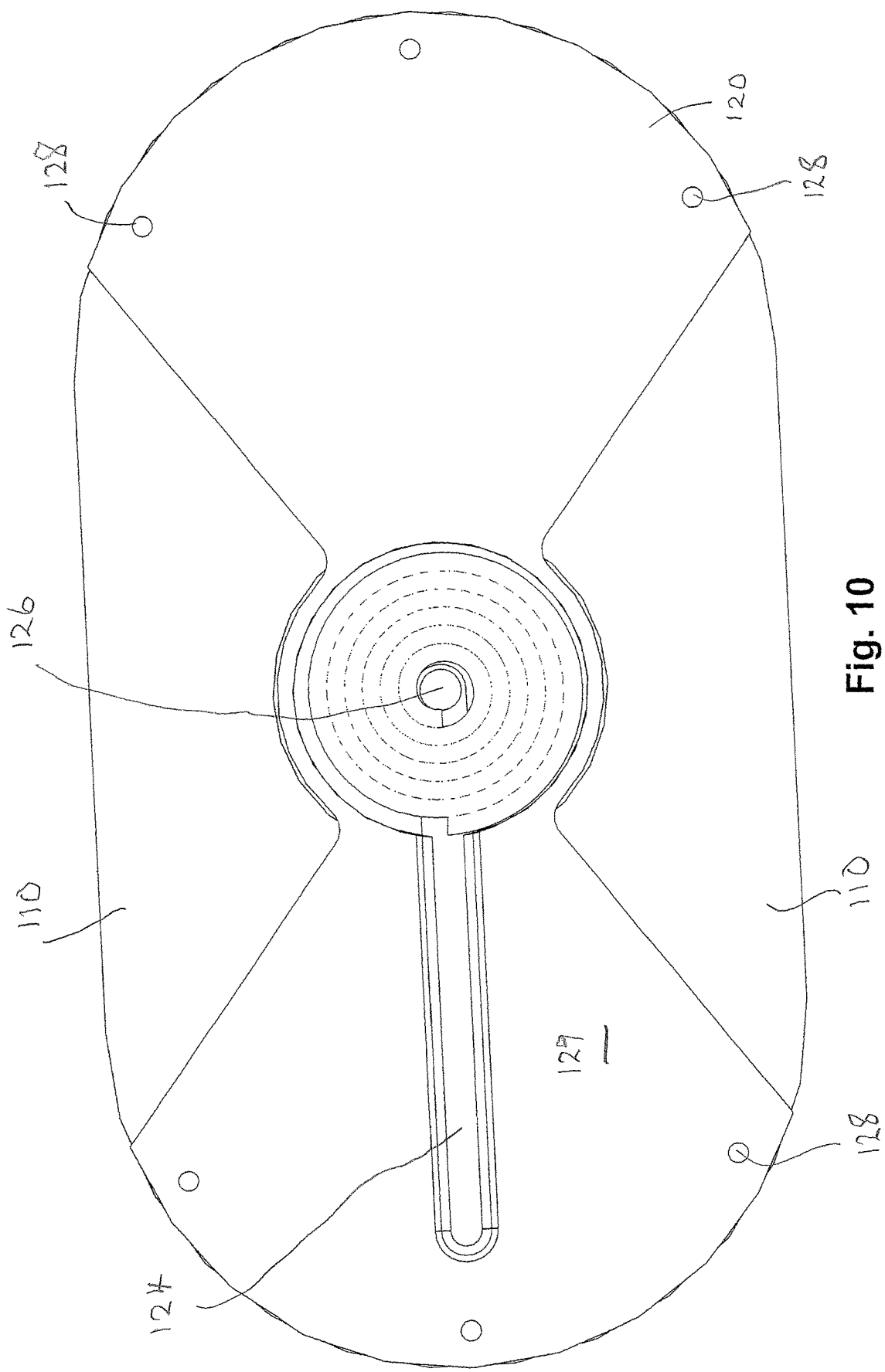
FIG. 10 is an enlarged top plan view of a partially assembled portion of the base portion of FIG. 6.
Figure 11:
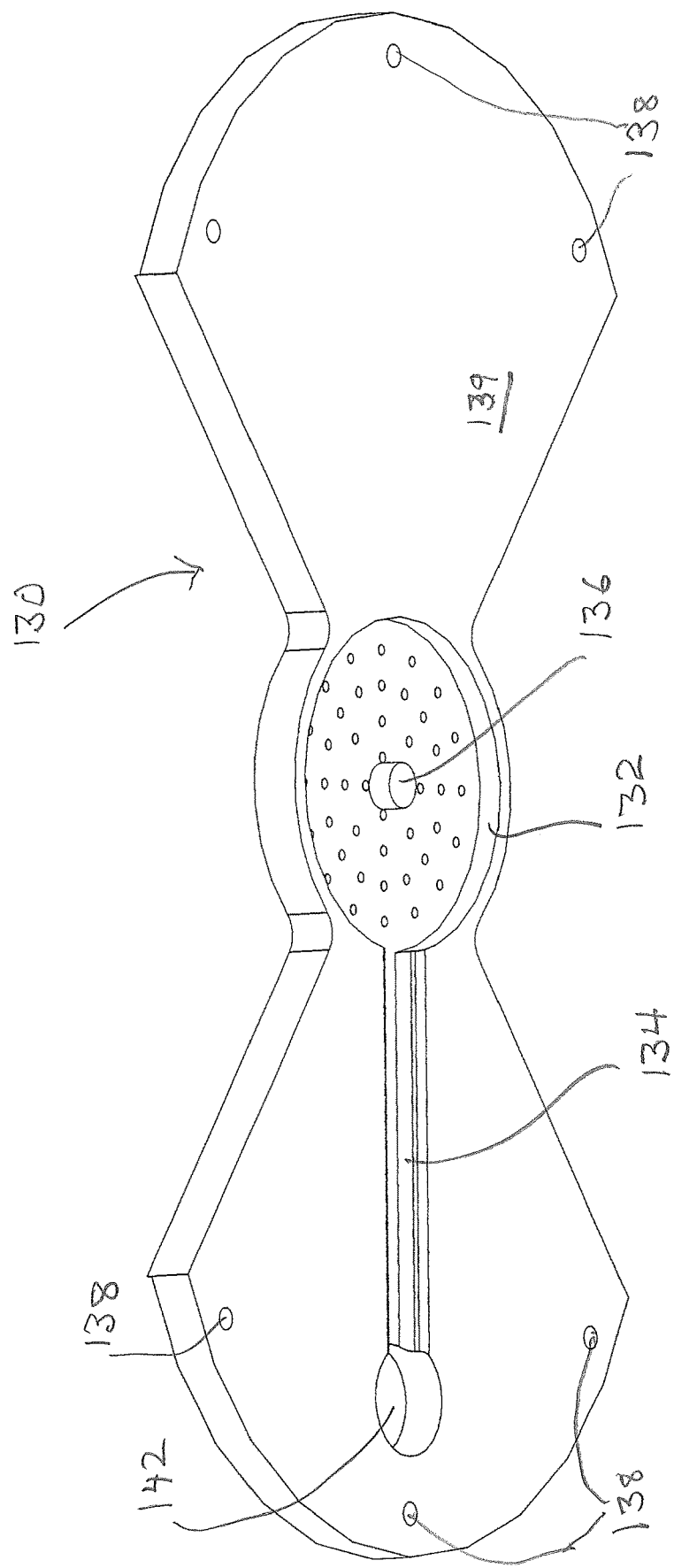
FIG. 11 is an enlarged underside perspective view of an upper component of the base of FIG. 6.
Figure 12:
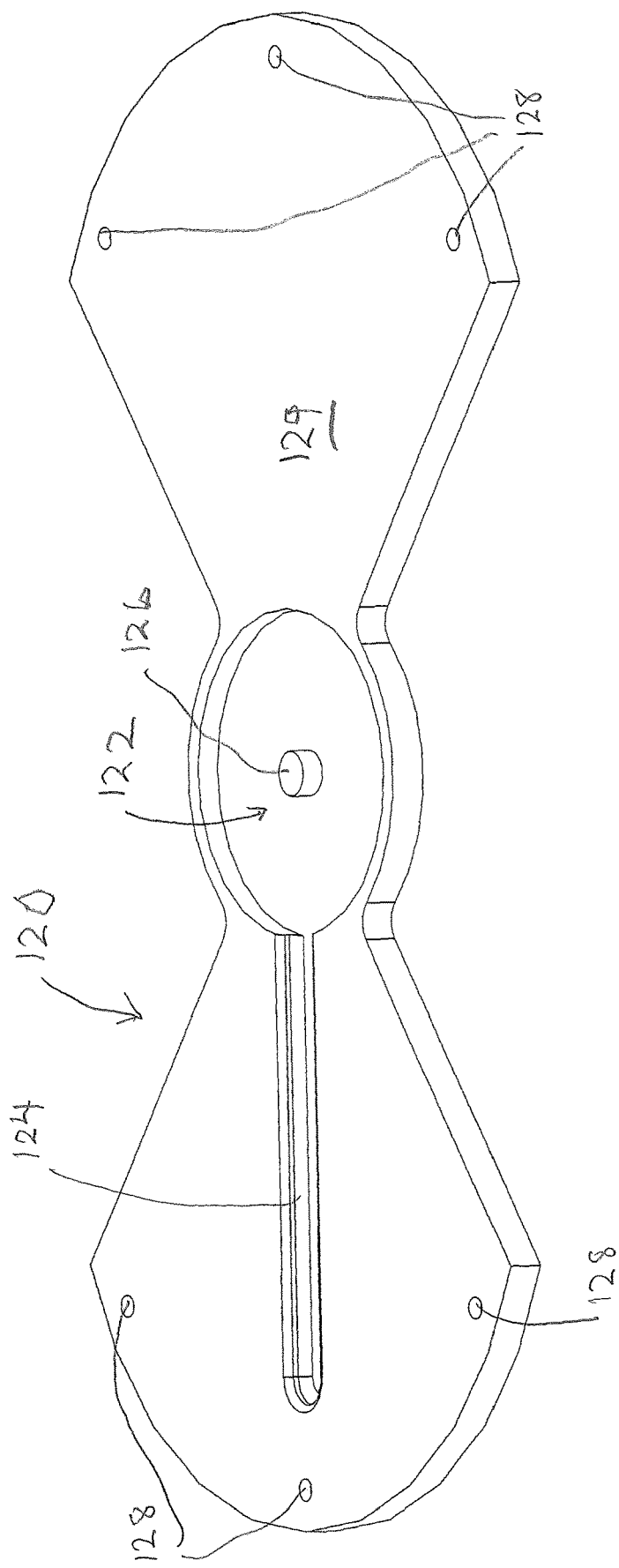
FIG. 12 is an enlarged top perspective view of a component for the base of FIG. 6 which engages against the component of FIG. 11.

With additional reference to FIG. 10, a single round or "pancake" induction coil 150 is received in the recess 132 and connects via an electrical cable extending through the slots 124 and 134 and opening 142 for electrical communication through the vertical support 64 and the standoff members 74. One embodiment of an induction heating coil 150 is constructed of 88 turns of a flat copper wire, selected to produce an intense magnetic field substantially in the same shape and size as the target anchor plate 220. Other coil configurations, such as a litz wire coil configuration are compatible with the disclosed induction heating tool. A dielectric spacer 154 is mounted in the recess 122 below the induction coil to provide an effective magnetic induction region for the coil. The spacer 154 may be manufactured from glass-filled epoxy high-temperature material. The upper member also includes a plurality of openings 156 which each receive heat induction pins 160. The pins 160 project upwardly through the top surface and thermally communicate with the coil 150 to provide an effective means for dissipating heat from the base.

Figure 6:
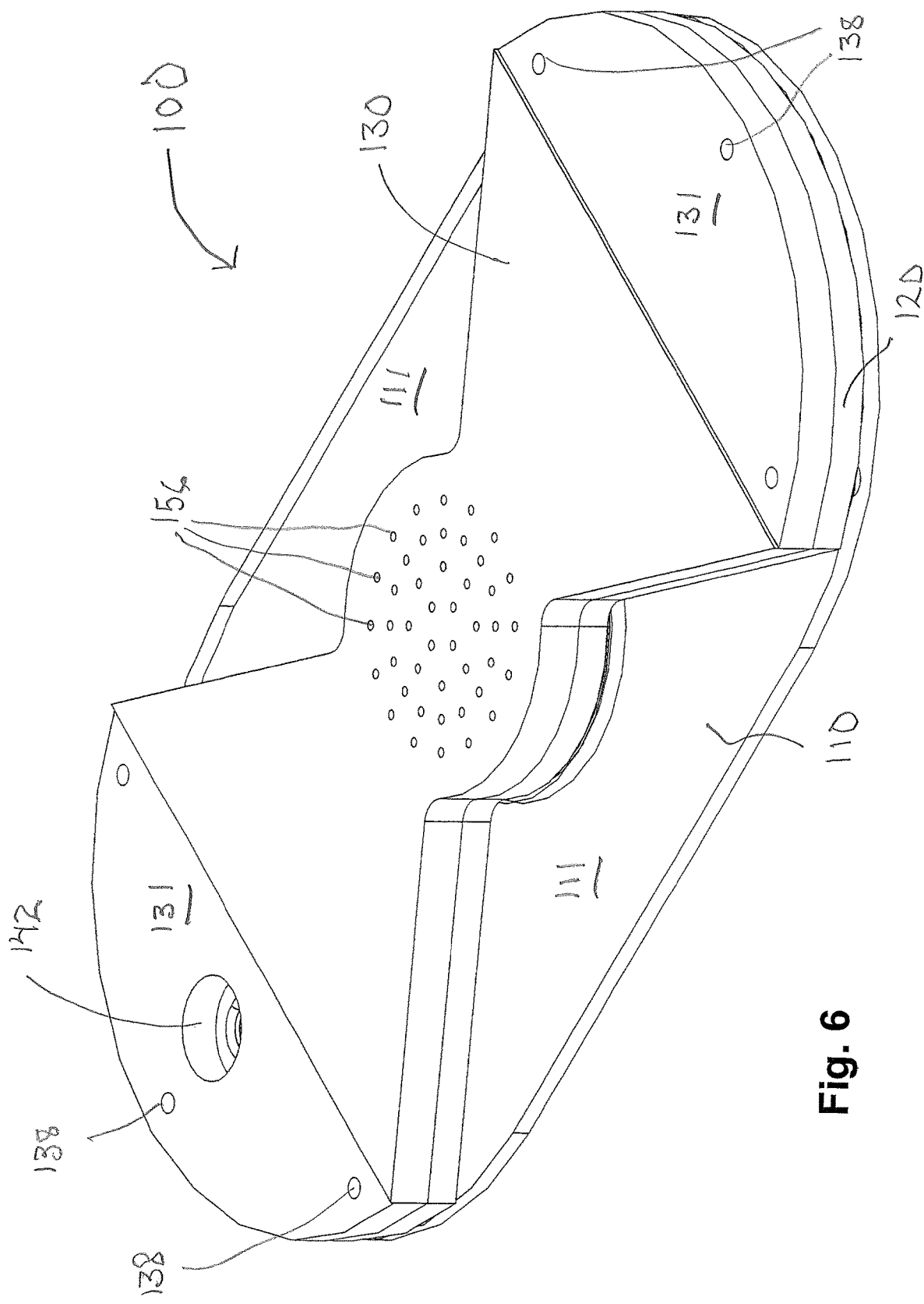
FIG. 6 is an enlarged perspective view of a base for the tool of FIG. 2.
Figure 7:
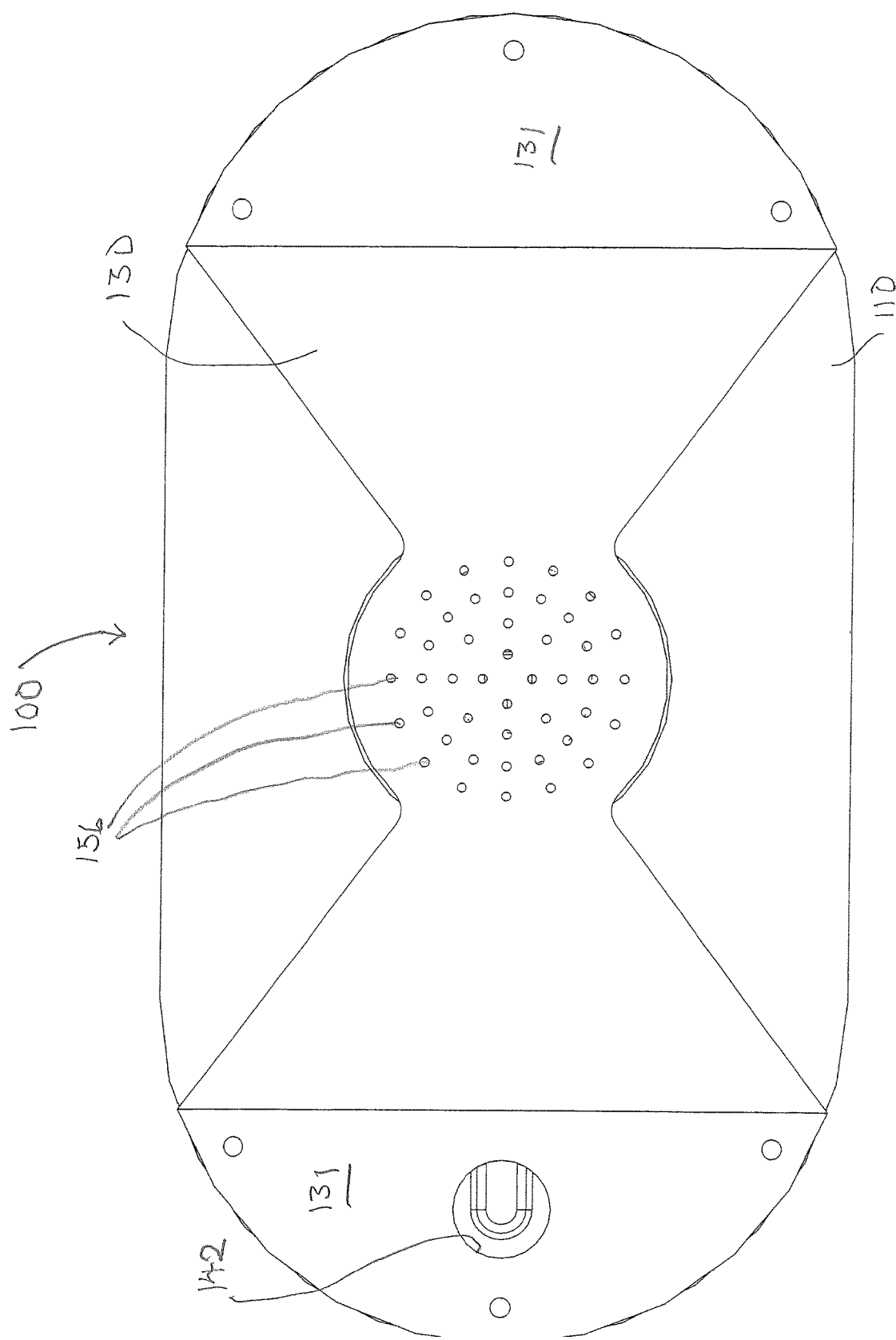
FIG. 7 is an enlarged top plan view of the base of FIG. 6.
Figure 8:
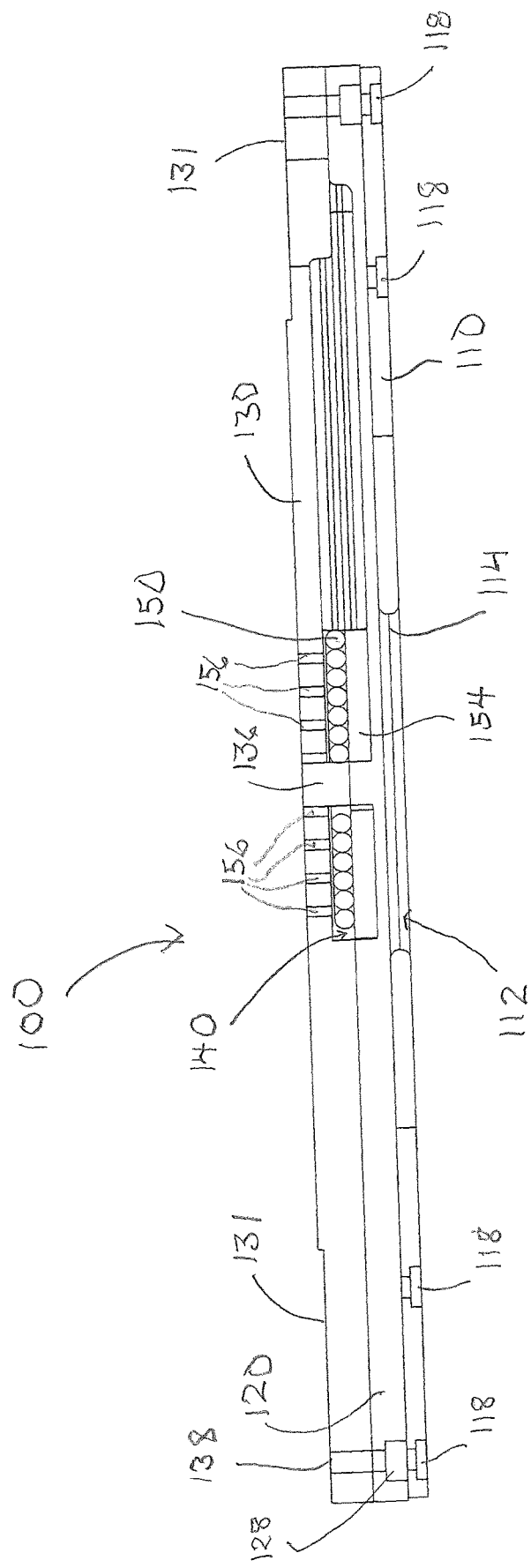
FIG. 8 is an enlarged central sectional view of the base of FIG. 6 taken from the rear thereof.
Figure 9:
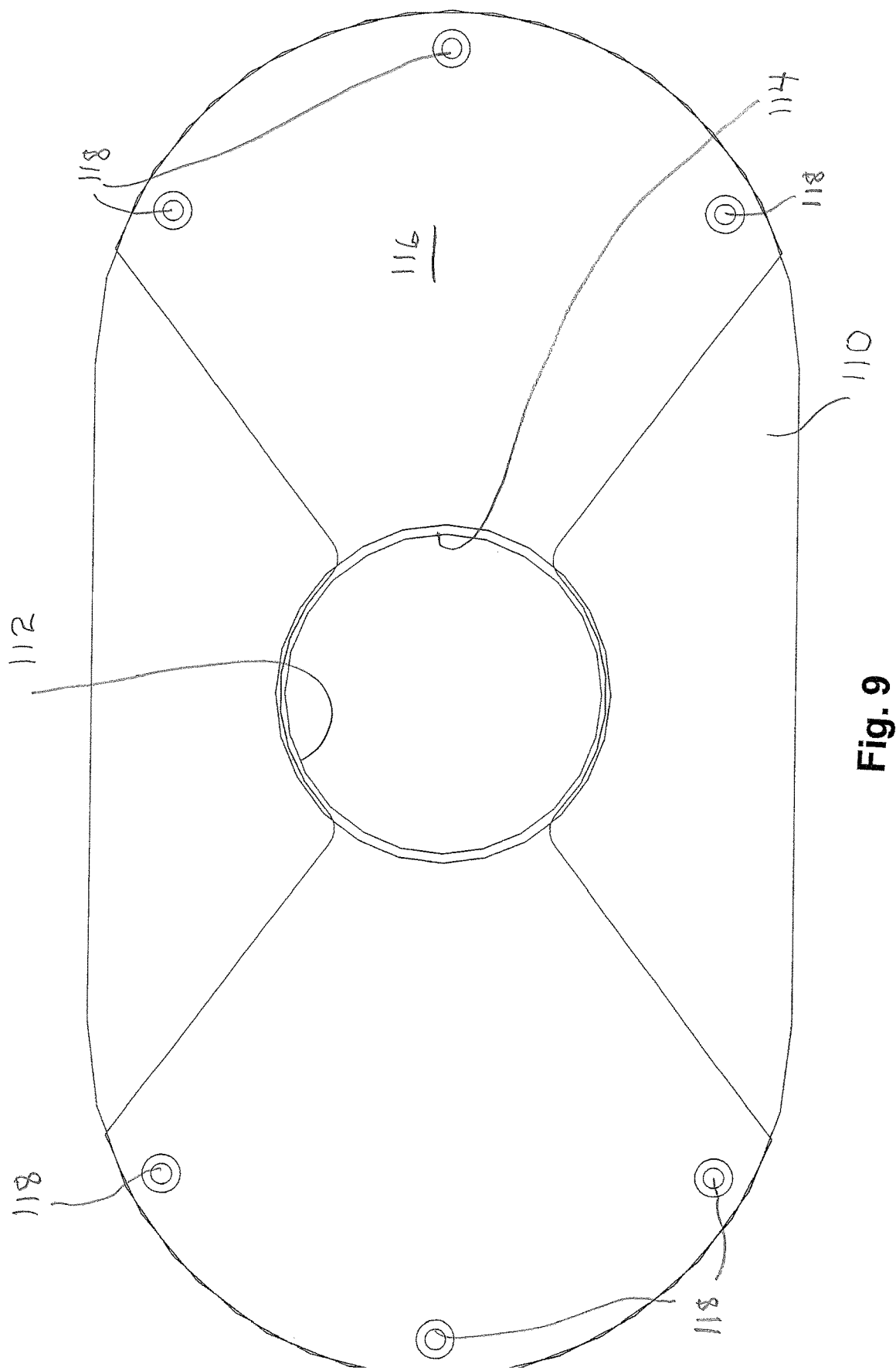
FIG. 9 is an enlarged bottom plan view of the base of FIGS. 2 and 6, with portions removed for clarity.

Base 100 has a bottom-most relatively flat (or planar) surface 116 (see FIG. 6). In the disclosed embodiment, member 110 is transparent so the operator may observe the membrane beneath the tool through portions of the upper surface 119 of member 110. The operator can see through member 110 to visually facilitate positioning of the induction coil 150 (located in recess 122) over an anchor plate 220.

Base 100 contains an induction heating coil 150 (which is disposed between the upper surface and the bottom-most planar portion of the base 100). There are two vertical support members 74 and 76 which act as stand-offs and as mechanical protection for the induction heating coil 150. These two stand-off members 74 and 76 mechanically connect to the bottom-most portions of the vertical supports 60 and 64.

The induction heating coil 150 tends to become hot when in use. Multiple rod-like heat sinks 160 extend through the upper surface of the base 100 to dissipate the heat. In the illustrated embodiment, these heat sinks 160 are small pin-type heat sinks (although other types of heat sinks could be used instead). Heat sinks 160 are located very close to the induction heating coil 150, and as such, allow for a substantial amount of cooling of the induction heating coil, without any moving parts. This same principle of operation is also used in the middle portion 40, in which the multiple heat sink elements are located proximal to the electrical components of the power supply, which provide a substantial cooling effect without any moving parts. In other words, the induction heating tool 10 has no fans or liquid cooling tubes (which are found in many conventional portable induction heaters). The rod-like heat sinks 160 of the illustrated embodiment are mounted on a substrate that is made of a dielectric material, so that this substrate can be in direct contact with the induction heating coil 150. This allows the heat sinks 160 of the heat sink subassembly to be physically very close to the induction coil 150, so that thermal energy can be effectively conducted away from the induction coil by the multiple heat sinks 160. In illustrated embodiment, the heat sink substrate is made of a glass-filled epoxy material.

Since the substrate of the heat sink subassembly is made of a dielectric material, it will not be raised in temperature due to any magnetic field effects that would otherwise be caused by the magnetic field emitted by the induction coil 150. The relatively small pin-type heat sinks 160 are also designed so that they will undergo very minimal heating from the magnetic field of the induction coil. In this manner, the heat sink subassembly mounted to the base portion 100 will effectively transfer heat from the induction coil 150, but at the same time not be affected to any major extent by the magnetic field emitted by induction coil 150. The rod-like pin heat sinks 160 are dimensioned and configured such that they do not get heated by the induction coil 150 during activation.

The induction heating tool 10 is designed to bond membrane roofing to coated steel anchor plates, in which the anchor plates are coated with a heat-activated adhesive that will affix the membrane layer to the steel anchor plates when the anchor plates themselves are raised in temperature by the magnetic field produced by the coil 150 of the induction heating tool 10. The heating tool 10 is designed so that it can be used by a person standing at all times, and may be referred to as a "stand-up" type of induction heating tool. The handle 20 can be picked up by a human hand, probably at the middle grippable portion 24, and lifted from one position to another on top of the membrane surface that is being applied to a roof.

The base portion 100 of tool 10 has a rather large predetermined footprint area so that the tool 10 will be stable, and can be left standing on a low slope roof. For example, the induction heating tool 10 is designed with a low center of gravity so that it can be used on an angled roof having a slope or grade as much as 2 parts in 12 (a 16.7% slope) which is a roof pitch angle of about 9.5 degrees.

Figure 14A:
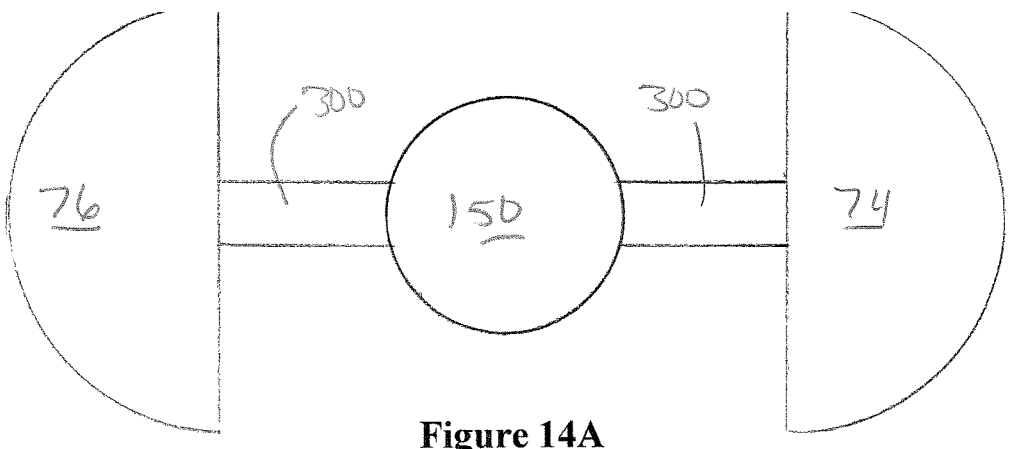
FIGS. 14A-14C schematically illustrate several alternative base configurations compatible with the disclosed induction heating tool.
Figure 14B:
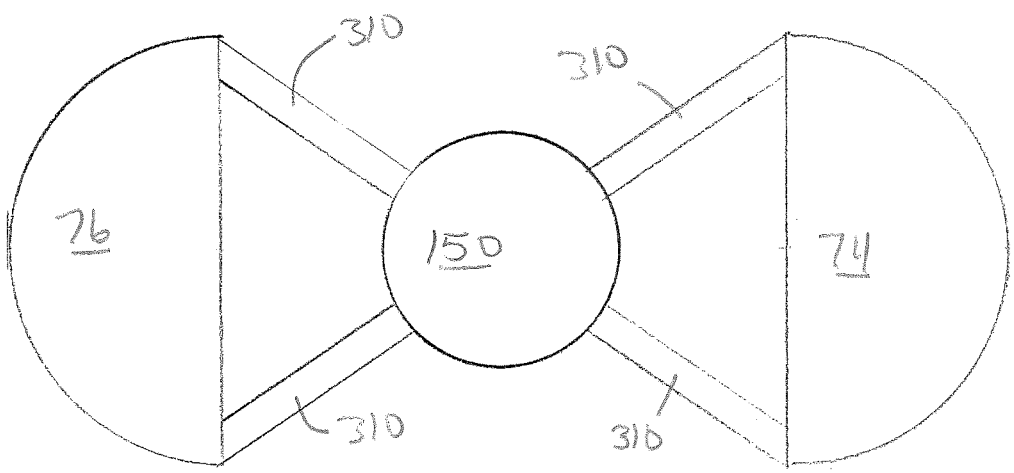
Figure 14C:
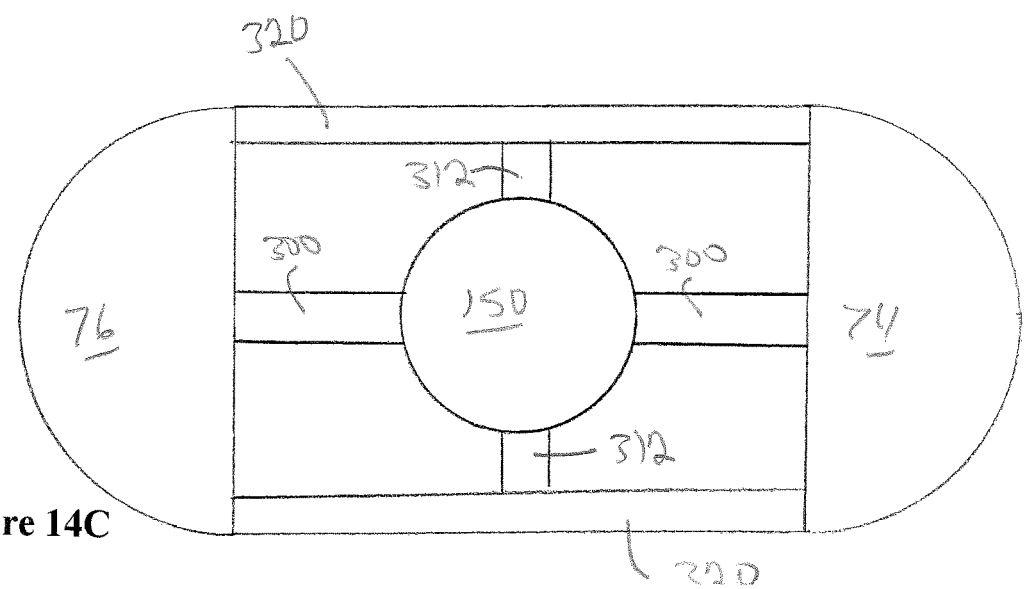

FIGS. 14A, 14B and 14C illustrate alternative configurations for the base of a stand-up induction heating tool. One objective of the base design is to provide the operator with an obvious indication of the location and size of the induction coil 150. Another objective is to allow the operator to see the area of the roof membrane immediately surrounding the induction coil 150. In the embodiment of FIGS. 6-14, this is accomplished by making the lower-most base member 110 transparent, so the roof membrane is exposed to the operator through the transparent member. Lower most base layer 110 may be omitted, and the coil 150 supported by other structures extending between base standoffs 74, 76 as shown in FIGS. 14A-14C. To avoid interactions with the magnetic field, structures supporting the induction coil 150 should be constructed of dielectric material such as plastic. In the embodiments shown in FIG. 14A-14C, support members 300, 310, 312 and 320 extend between standoffs 74, 76 to support the induction coil 150. The area between support members and surrounding the induction coil 150 is open, giving an operator an unobscured view of the roofing membrane.

Since the height of the handle 20 can be adjusted, the heating tool 10 can be used by operators of various heights, and can simply be picked up from one location and lifted to another location on the roof where it is placed over one of the anchor plates that will then be bonded to the membrane. The user will push the activation switch 56 and can walk away from that location while the heating tool 10 automatically energizes its induction coil 150 for the proper amount of time to correctly heat the steel anchor plate, thereby raising the temperature of the heat-activated adhesive (without burning that adhesive), and sufficiently heating it so that the adhesive melts and adheres to the bottom surface of the membrane layer.

The induction heating tool 10 has an adjustable energy setting, so that the user can control how much energy will be emitted by the magnetic field produced by the induction coil 150, over an activation cycle. This will allow the heating tool 10 to operate on roofs at different ambient temperatures, without either overheating or under heating the steel anchor plates with respect to the appropriate amount of heating required to activate the adhesive coating of the anchor plate. A control circuit such as disclosed in U.S. Pat. No. 6,509,555 is capable of automatically selecting the power level at which the coil 150 will be driven, and is also capable of automatically determining when the heating (activation) cycle has been completed, based upon this user setting of the adjustable energy setting for the anchor plates of this jobsite. These automatic control capabilities are disclosed in U.S. Pat. No. 6,509,555.

In a preferred embodiment, the user will have ten different incremental adjustments that can be selected using the pushbutton controls 53. The appropriate information will be displayed on the display screen 52, so the user can see which of the ten available settings is being selected (or has previously been selected). The user can merely press the activation button 56 once the unit has been placed in the proper position over one of the anchor plates, and the user can then walk away to perform another task.

Various capabilities and features, such as disclosed in U.S. Pat. Nos. 6,509,555 and 8,492,683, can be incorporated into the induction heating tool 10. The base 100 is very compatible with the many innovative features for prior portable induction heating tools, a few of which are described below.

In one mode, a single user can use two individual induction heating tools 10 on the same roof. Each heating tool is provided with an acoustic output device that provides the user with information as to when a heating activation cycle has started and when that cycle has completed. With two different induction heating tools on the same roof, the user can select one of the tools to use a first audible tone (i.e., selecting a first frequency for the first acoustic output device on the first tool), and for the second heating tool on the same roof, the user can select a second audible tone (i.e., a different audible frequency) for its second acoustic output device on the second tool. In that manner, the user can use two different induction heating tools simultaneously, and the user will know which tool is currently operating in a heating cycle, and will be able to tell which of the tools has completed a heating cycle, merely from listening to the audible sounds produced by the tools themselves.

It will be understood that users may operate two separate heating tools in which the sound wave-producing devices for both tools would emit the exact same audible frequency, if desired. For example, the first tool on a particular roofing jobsite could emit "short" beeps at a frequency #1, while the second heating tool on the same roof jobsite could be emitting "long" beeps substantially at the same frequency #1. At first, it may be somewhat more difficult for the user to understand which tool is emitting the beeps, but with a short amount of practice, the user would quickly understand that the short beeps are coming from the first tool while the long beeps are coming from the second tool. The pattern of beeps could still be the same, i.e., a single long or short beep would have the same meaning for the two different tools (e.g., at the beginning of an activation cycle). Dual beeps could occur for both tools at the end of an activation cycle, if desired, and the dual beeps would be two short beeps for the first tool and two long beeps for the second tool, and so on.

In a further embodiment, the two separate tools could be using substantially the same audible frequency, in which one of the tools emits "steady" tones while the second tool emits "warbling" tones.

In other words, various different sound patterns at the same audible frequency for two different tools on the same roof jobsite can be used, instead of different frequencies of tones.

In yet another embodiment, induction heating tool #1 could produce a music chord, such as a major fifth chord (e.g., C, E, G) or a minor fifth chord (e.g., C, E-flat, G), while induction heating tool #2 emits only a single note. This certainly would allow a user to easily discern the individual operation of both tools, while on the same roof jobsite.

The user may select which energy setting is to be used for the particular jobsite. The energy setting can take into effect the ambient temperature at the roof, as of when the user is actually going to use induction tool 10 to seal a membrane roof to its anchor plates. In a preferred mode of operation, the user has ten (10) different settings for selecting the energy level at which the tool will be used. On the display screen 52, the user will have a menu of choices and can scroll up or down using the pushbuttons 53. When the user has selected the energy setting that is desired, the user can depress the correct pushbutton 53, and that energy setting will be used for the next run of heating events by operating tool 10.

In one embodiment, the user enters the number of discs that are going to be used on this particular jobsite. The number of discs is determined by the roof size and the density of anchor plates that are to be used for a particular membrane roof. If, for example the roof is rectangular, and there would be twenty (20) discs in one direction (along one edge of the roof), and thirty (30) discs along the other direction (along the other edge of the roof), then there would be six hundred (600) total discs for this roof. That is the number the user can select using the user pushbuttons 53.

The user may also perform data logging functions, if desired. At this step, the user can inspect values stored in a memory circuit used with the processing circuit of the electronic controller 48. Some of the information stored in memory can include the number of activations of this induction heating tool 10 throughout its lifetime, the number of discs that have already been "sealed" on this particular jobsite, the number of discs that remain to be sealed on this jobsite, and also the number of "faults" that have occurred on this jobsite. In addition, the data log can also store in memory other important information, such as the time and date of when the energy setting has been changed, and to what new value (i.e., the values between one and ten) for the energy setting.

Other information can also be stored, such as the time and date for beginning the sealing of a particular roof (or jobsite), and also the time and date when the job ends for sealing a particular roof (or jobsite). In addition, the data log can also be programmed to contain the time and date of particular faults, as well as the type of fault.

The electrical components of tool 10 also require "high voltage" power components, so as to provide sufficient power to drive the induction coil 150. A relatively high voltage power supply is provided, starting with a rectifier circuit, which supplies power to a DC-to-DC converter. The DC:DC converter supplies power to a power oscillator circuit, which directly drives the induction coil 150. The CPU controls the power output setting of the inverter circuit, which in turn effectively controls the power settings of the power oscillator circuit and coil driver circuit. It should be noted that the power setting of tool 10 is automatically controlled so as to properly activate (or "heat") the target anchor plate, which is a metal susceptor that creates eddy currents when exposed to a magnetic field (such as that produced by induction coil 150.

Details of the types of circuit designs that can be used for the purposes discussed above are found in other co-owned U.S. patents and patent applications, including: U.S. Pat. No. 6,509,555, issued Jan. 23, 2003, titled: "HAND HELD INDUCTION TOOL;" U.S. Pat. No. 6,875,966 issued on Apr. 5, 2005, titled: "PORTABLE INDUCTION HEATING TOOL FOR SOLDERING PIPES;" and U.S. Pat. No. 7,399,949, issued on Jul. 15, 2008, titled: "METHOD AND APPARATUS FOR ATTACHING A MEMBRANE ROOF USING INDUCTION HEATING OF A SUSCEPTOR". While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

The invention claimed is:

1. A base for a portable induction tool adapted to heat a metal anchor plate on a building structure, said base comprising:

first and second supports extending from the base to a handle separated from the base in a longitudinal direction, said first and second supports spaced apart from each other in a lateral direction; and an induction coil supported between said first and second supports by at least one coil support member extending laterally from each of said first and second supports toward said induction coil, said induction coil having a circular shape and a diameter, wherein, said base defines a circular recess in which said induction coil is arranged, said circular recess centered between said first and second supports and surrounded by a wall having an outside surface concentric with said circular recess, said at least one coil support members connected to said wall at laterally opposed positions with said outside surface extending between said at least one coil support members to define an external side profile of said base showing the position of the induction coil, a window between said at least one coil support members and laterally outward of said external profile being open to allow an operator to directly observe the building structure beneath said base through said window when the base is positioned over the building structure.

2. The base of claim 1, comprising:

first and second coil support members extending from said first and second supports to said wall; and multiple heat sinks disposed in thermal communication with said induction coil, wherein said heat sinks extend from thermal communication with said induction coil to a location where heat can be delivered to the ambient environment.

3. The base of claim 2, wherein said first and second coil support members are constructed of dielectric material.

4. The base of claim 2, wherein said heat sinks comprise an array of rod-like members.

5. The base of claim 1, wherein a lowermost portion of the base defines a recess having a rounded inner rim to receive the anchor plate.

6. The base of claim 1, wherein the window extends radially outward from the external side profile in at least two diametrically opposed sides of said induction coil.

7. The base of claim 1, wherein the window extends laterally from the external side profile on a first side of the base and extends laterally from the external side profile on a second side of the base that is diametrically opposite from the first side of the base.

8. The base of claim 1, wherein the building structure defines a top surface and the metal anchor plate is positioned on the top surface.

9. The base of claim 8, wherein the building structure further comprises a membrane positioned over the metal anchor plate and top surface.

10. A portable induction heating apparatus adapted to heat a metal plate on a building structure, said portable induction heating apparatus comprising:

a body defining a weather-resistant cavity, said body having first and second sides;

an electrical power supply and a controller positioned in said cavity;

first and second supports extending along the first and second sides and arranged to support said body;

at least one window positioned between said pair of supports; and a rectangular base spaced from said body and connected thereto by said first and second supports, said base comprising first and second coil support members cooperatively defining a circular recess surrounding an induction coil at the center of the base, said induction coil communicating with said power supply and said controller, said induction coil having a circular shape and a diameter, said recess surrounded by a wall having a lateral outside surface concentric with said circular induction coil, said lateral outside surface defining an external side profile of said base showing the position of said induction coil, said at least one window comprising an opening longitudinally through said base defined between said first and second supports and laterally outward of said external profile, wherein said induction coil generates an oscillating magnetic field to heat a metal object situated within said magnetic field, said window allowing an operator to directly observe the building structure beneath said base through said at least one window in at least one location outside the diameter of said induction coil when said base is positioned over the building structure.

11. The apparatus of claim 10, wherein said induction coil comprises a flat coil of ribbon-shaped wire.

12. The apparatus of claim 11, wherein said induction coil comprises approximately 88 turns of flat, copper wire.

13. The apparatus of claim 10, wherein said first and second coil support members are constructed of dielectric material.

14. The apparatus of claim 10, wherein said first and second coil support members include a bar extending across said base to support said induction coil between said first and second supports, the diameter of said induction coil bisected by said bar.

* * * * *